United States Patent
Chen (10) Patent No.: US 11,199,214 B2
(45) Date of Patent: Dec. 14, 2021

(54) QUICK FASTENING SCREW

(71) Applicant: ESSENCE METHOD REFINE CO., LTD., Tainan (TW)

(72) Inventor: Ling-Fang Chen, Tainan (TW)

(73) Assignee: Essence Method Refine Co., Ltd., Tainan (TW)

( * ) Notice: Subject to any disclaimer, the term of this patent is extended or adjusted under 35 U.S.C. 154(b) by 333 days.

(21) Appl. No.: 16/577,076

(22) Filed: Sep. 20, 2019

(65) Prior Publication Data
US 2021/0088068 A1 Mar. 25, 2021

(51) Int. Cl.
*F16B 25/00* (2006.01)
*F16B 25/10* (2006.01)

(52) U.S. Cl.
CPC ...... *F16B 25/0078* (2013.01); *F16B 25/0057* (2013.01); *F16B 25/103* (2013.01); *F16B 25/00* (2013.01); *F16B 25/0063* (2013.01)

(58) Field of Classification Search
CPC .. F16B 25/00; F16B 25/0057; F16B 25/0063; F16B 25/0078; F16B 25/103; F16B 33/02; F16B 33/002; F16B 35/041; F16B 39/00
USPC ............................. 411/387.1, 411, 424, 425
See application file for complete search history.

(56) References Cited

U.S. PATENT DOCUMENTS

| | | | | |
|---|---|---|---|---|
| 3,246,556 A * | 4/1966 | Phipard, Jr. | ............ | B21H 3/027 411/416 |
| 6,254,327 B1 * | 7/2001 | Chen | ................... | F16B 25/0015 411/310 |
| 6,468,014 B2 * | 10/2002 | Chen | ................... | F16B 25/0015 411/387.4 |
| 7,704,030 B2 * | 4/2010 | Chen | ................... | F16B 25/0068 411/411 |
| 8,419,332 B2 * | 4/2013 | Kochheiser | ......... | F16B 25/0031 411/412 |
| D892,605 S * | 8/2020 | Sokol | ............................ | D8/387 |
| 2002/0141848 A1 * | 10/2002 | Hsu | ..................... | F16B 25/0015 411/411 |
| 2004/0018069 A1 * | 1/2004 | Lai | ........................ | F16B 25/103 411/387.1 |
| 2009/0010734 A1 * | 1/2009 | Lin | ....................... | F16B 23/003 411/413 |
| 2009/0245972 A1 * | 10/2009 | Lin | ....................... | F16B 5/0275 411/411 |
| 2012/0183371 A1 * | 7/2012 | Druschel | ............ | F16B 25/0073 411/387.1 |

(Continued)

*Primary Examiner* — Roberta S Delisle
(74) *Attorney, Agent, or Firm* — Rosenberg, Klein & Lee (57) ABSTRACT

A quick fastening screw includes a head, a shank with spirally-disposed thread convolutions, and a drilling portion. Each thread convolution has at least three flank sections and at least three arc sections each formed between any two adjacent flank sections. Two ends of each arc section and the flank sections adjacent to the arc section are respectively intersected to thereby form two joints. Between the two joints is formed a curved cutting portion which forms a radian not more than a quarter of a maximum thread radius so that each curved cutting portion becomes sharp to cut quickly, speed up a screwing operation, decrease the friction between the thread convolutions and a workpiece, and reduce the resistance and torque. The non-circular thread convolutions also receive cut debris efficiently and prevent the cracking of the workpiece caused by the undue accumulation of the debris.

14 Claims, 10 Drawing Sheets

(56) References Cited

U.S. PATENT DOCUMENTS

2014/0286728 A1* 9/2014 Park .................. F16B 25/0015
411/411

* cited by examiner

QUICK FASTENING SCREW

BACKGROUND OF THE INVENTION

1. Field of the Invention

This invention relates to a screw and relates particularly to a screw capable of being quickly fastened into the workpiece.

2. Description of the Related Art

Figure 1:
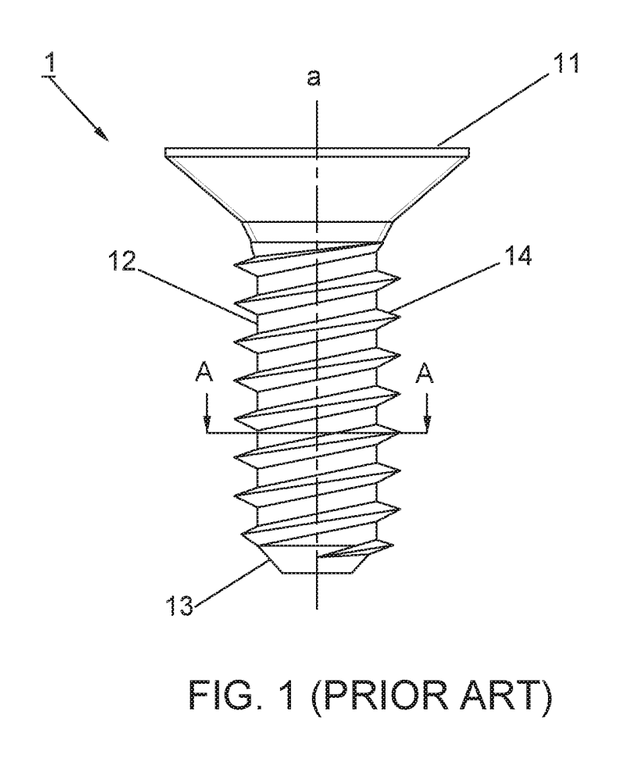
FIG. 1 is a schematic view showing a conventional screw.
Figure 2:
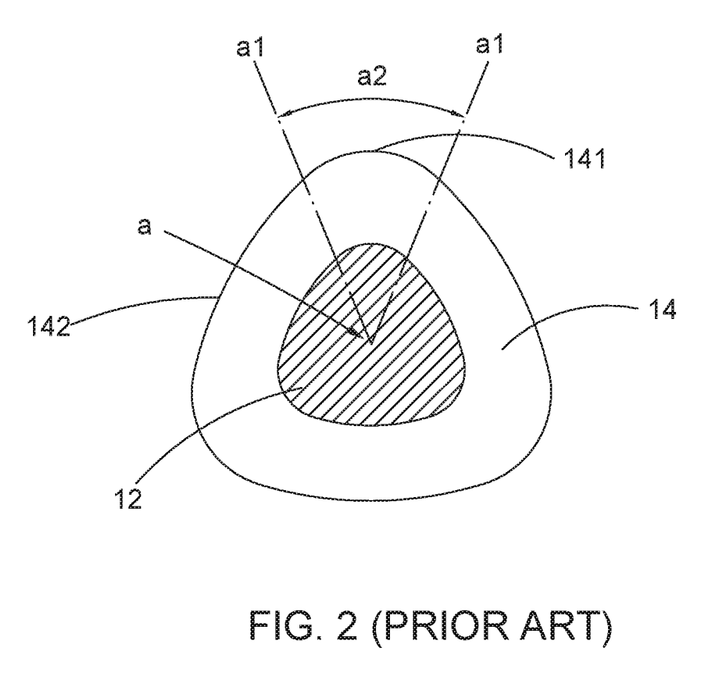
FIG. 2 is a cross-sectional view taken on line A-A in FIG. 1.

Referring to FIGS. 1 and 2, a conventional screw 1 includes a head 11, a shank 12 extending from the head 11 along an axis a and having a drilling portion 13 formed opposite to the head 11, and a plurality of threads 14 spirally disposed on the shank 12. Each thread 14 has three flanks 142 and three corners 141. Each corner 141 is formed between any two adjacent flanks 142 and is curved. Each corner 141 defines two imaginary lines a1 representing its boundary spaced from the axis a. An included angle a2 is formed between the imaginary lines a1 and exceeds 50 degrees. A radian formed by the corner 141 is equal to or greater than one third (⅓) of a radius of the thread 14. For example, if the radius is 3 mm, the corresponding circumference of the corner 141 is equal to or greater than 3/3=1 R. When the drilling portion 13 is put on a workpiece (not shown) and users add forces to rotate the head 11, the corners 141 of the thread 14 start a cutting action for screwing the screw 1 into the workpiece. However, the flanks 142 each have a curved shape because of the curved corner 141, which renders the corners 141 unable to cut efficiently during the screwing operation, causes friction between the flanks 142 and the workpiece, and renders the threads 14 unable to provide enough debris-receiving space between the corners 141 and the flanks 142. Accordingly, the screwing resistance against the screw 1 is increased, and the cutting action becomes slow. These conditions cause cracks in the workpiece because it cannot suffer undue torque. Thus, the screw 1 still needs improvements.

SUMMARY OF THE INVENTION

The object of this invention is to provide a quick fastening screw having a preferable cutting action, decreasing the resistance and torque while screwing, and speeding up the screwing operation.

The screw of this invention adapted to be screwed into a workpiece by a screwing direction includes a head, a shank extending longitudinally from the head and defining an axis, a drilling portion connected to the shank and located opposite to the head, and a threaded portion with a plurality of thread convolutions spirally disposed on the shank. The shank includes at least three shank sections to become non-circular. Each thread convolution includes at least three flank sections, at least three arc sections, and at least three curved cutting portions. Each arc section is formed between any two adjacent flank sections. Two ends of each arc section and the two adjacent flank sections meet at two joints respectively. Each curved cutting portion is formed between the two joints. A maximum thread radius is defined from the axis taken as a center to an outermost edge of the curved cutting portion. The threaded portion defines a first path which goes toward the head and is defined by connecting respective ones of the curved cutting portions of different thread convolutions located at corresponding respective positions sequentially. In the preferred embodiments, the first path is parallel to the axis or spirals around the axis to assume a first spiraling mode. Each thread convolution also defines a first reference line passing from the axis through each curved cutting portion and two boundary lines passing from the axis through the two joints respectively. A first included angle is defined between each boundary line and the first reference line and ranges from 20 to 25 degrees. A second included angle is defined between the two boundary lines and is not more than 50 degrees. Accordingly, a radian formed by the curved cutting portion is preferably equal to or less than a quarter of the maximum thread radius so that the screw cuts sharply to execute a quick screwing operation, reduce friction between the flank sections and the workpiece, and decrease the resistance and torque while screwing. Thus, the cutting ability of the screw is promoted to speed up the screwing operation. The thread convolutions provide sufficient space for receiving more debris and prevent the cracking of the workpiece caused by the accumulation of too much debris.

Preferably, the shank includes at least three curved sections with at least three crest portions. Each curved section is formed between any two adjacent shank sections. Shapes of the shank sections and curved sections are consistent with shapes of flank sections and arc sections respectively so that an outline of the shank corresponds to an outline of thread convolutions in cross section. The shank defines a maximum shank radius extending from the axis to each crest portion, and a radian formed by each crest portion is not more than a quarter of the maximum shank radius.

Preferably, it is possible to provide more than three shank sections and more than the flank sections for each thread convolution.

Preferably, the first path is parallel to the axis. Alternatively, the first path spirals around the axis to assume a first spiraling mode.

Preferably, the threaded portion spirals densely around the shank and extends to the drilling portion, so the shank may not be exposed when the thread convolutions are not spaced from each other. The thread convolutions can be either right-handed convolutions or left-handed convolutions.

Preferably, thread convolutions are spaced apart to expose portions of the shank, and the exposed portions of the shank defines a second path going toward the head and defined by connecting respective ones of crest portions of the exposed portions of the shank located at corresponding respective positions sequentially. The second path spirals around the axis to assume a second spiraling mode. The first spiraling mode of the threaded portion can be different from or be the same as the second spiraling mode of the shank.

Preferably, it is possible that the screw defines a first region and a second region between the first region and the head. The thread convolutions are spaced apart to expose first and second portions of the shank. The first exposed portions are located within the first region, and the second exposed portions are located within the second region. Each first exposed portion of the shank includes at least three cutting edges, and each cutting edge is formed at an intersection of two cutting walls protruding from each curved section. A third included angle is defined between the two cutting walls and is an acute angle. A third path is defined within the first region by connecting respective ones of cutting edges of the first exposed portions located at corresponding respective positions sequentially. The third path spirals around the axis and is formed in either a right-handed spiral or a left-handed spiral. A fourth path is defined within the second region by connecting respective ones of crest portions of the second exposed portions at corresponding respective positions sequentially. The fourth path is parallel to the first path and is preferably parallel to the axis.

Preferably, the shank includes a thread-free portion to divide thread convolutions into first thread convolutions and second thread convolutions.

Preferably, the drilling portion is formed in a non-circular shape and is formed without having thread convolutions.

DETAILED DESCRIPTION OF THE PREFERRED EMBODIMENTS

Figures 3, 4:
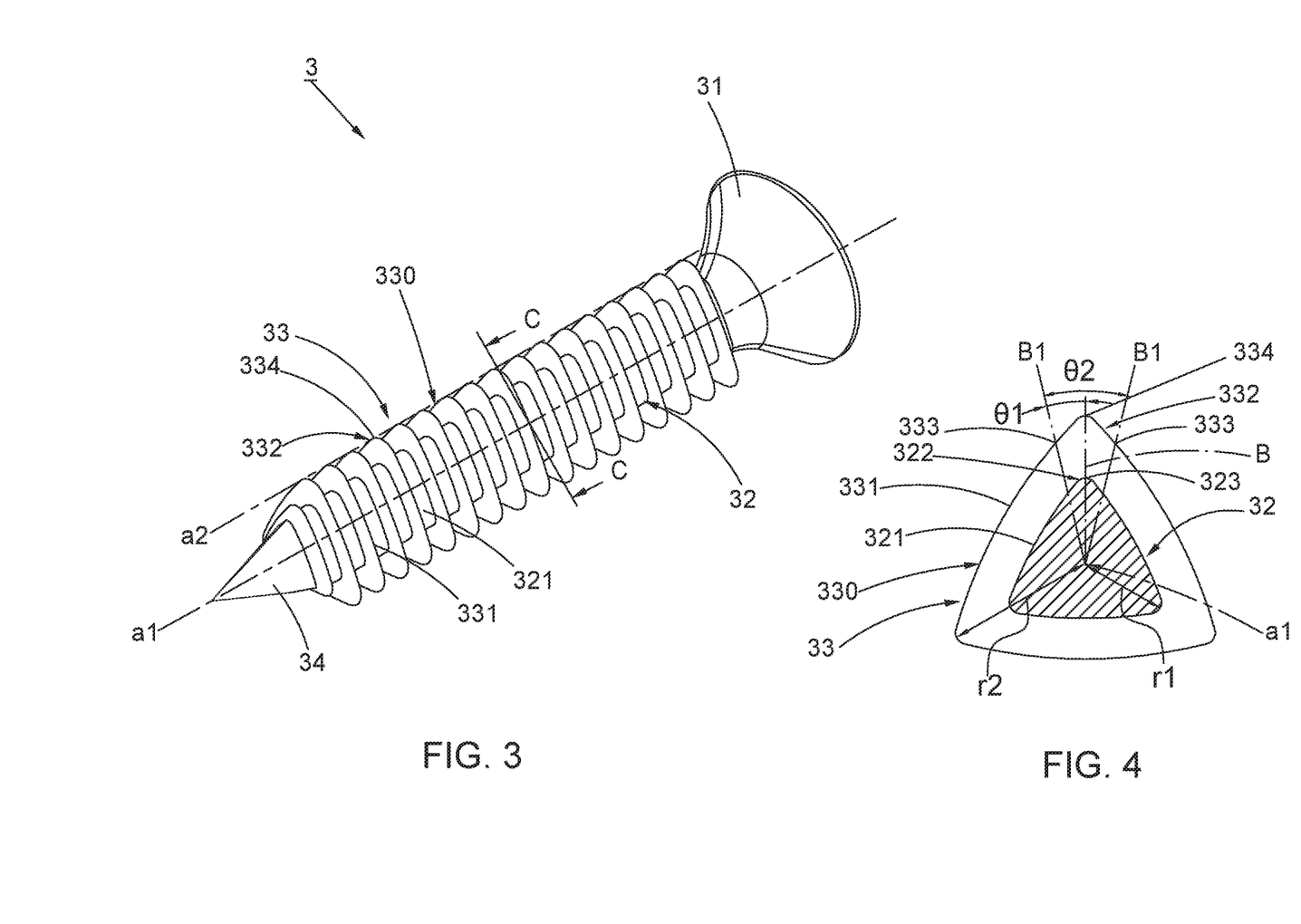
FIG. 3 is a schematic view showing a first preferred embodiment of this invention.
FIG. 4 is a cross-sectional view taken on line C-C in FIG. 3.
Figure 5:
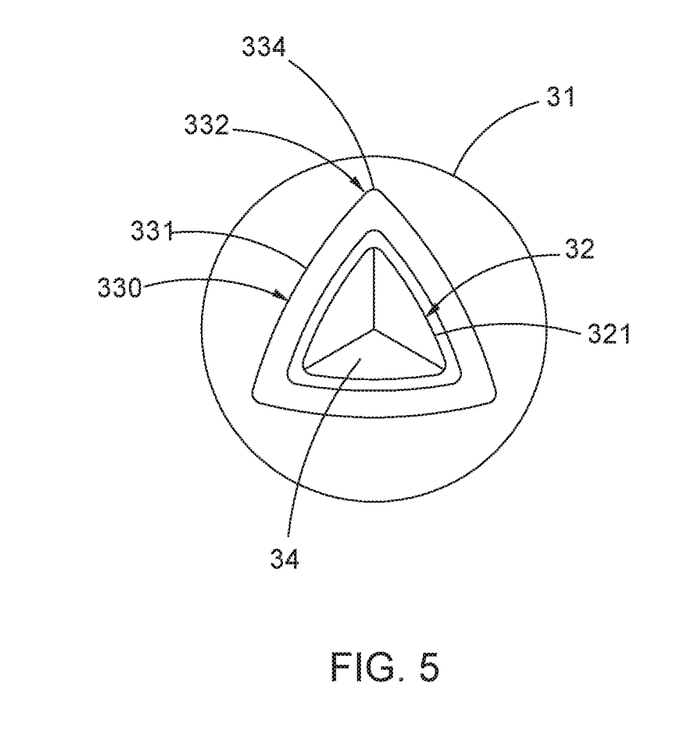
FIG. 5 is a bottom plan view of FIG. 3.

Referring to FIGS. 3 to 5, a first preferred embodiment of a quick fastening screw 3 includes a head 31, a shank 32, a threaded portion 33, and a drilling portion 34. The screw 3 is adapted to be screwed into a workpiece by a screwing direction. The shank 32 extends longitudinally from the head 31 and defines an axis a1 passing from the drilling portion 34 through a center of the head 31. The drilling portion 34 is connected to the shank 32 and located opposite to the head 31. The threaded portion 33, defined by a plurality of thread convolutions 330, is spirally disposed on the shank 32.

Each thread convolution 330 includes at least three flank sections 331 and at least three arc sections 332. Each arc section 332 is formed between any two adjacent flank sections 331. Two ends of each arc section 332 and the flank sections 331 adjacent to the arc section 332 meet at two joints 333 respectively. The thread convolution 330 also includes at least three curved cutting portions 334, each of which is formed on the arc section 332 and is located between the two joints 333. When the axis a1 is taken as a center, a distance from the axis a1 to an outermost edge of the curved cutting portion 334 is defined as a maximum thread radius r2 of the thread convolution 330. The threaded portion 33 defines a first path a2 going toward the head 31. Respective ones of the curved cutting portions 334 located at corresponding respective positions are sequentially connected so that the first path a2 is defined. For example, three curved cutting portions 334 of each thread convolution 330 are situated at different positions, e.g. position A, B, and C, and all curved cutting portions 334 of different thread convolutions 330 at position A are connected in sequence to assume the first path a2 which represents how the curved cutting portions 334 at the same position are arranged. The first path a2, shown in FIG. 3, is parallel to the axis a1. Alternatively, the first path a2 spirals around the axis a1 to assume a first spiraling mode, shown in FIG. 6.

When the axis a1 is taken as a basis, each thread convolution 330 defines a first reference line B passing from the axis a1 through each curved cutting portion 334 and also defines two boundary lines B1 passing from the axis a1 through the two joints 333 respectively. A first included angle θ1 is defined between each boundary line B1 and the first reference line B and ranges from 20 to 25 degrees. A second included angle θ2 is defined between the two boundary lines B1 and is not more than 50 degrees, namely is equal to or less than 50 degrees. Accordingly, a radian formed by the curved cutting portion 334 between the two joints 333 does not exceed a quarter (¼) of the maximum thread radius r2. For example, if the maximum thread radius r2 is 3 mm, the corresponding circumference of the curved cutting portion 334 is equal to or less than ¾=0.75 R. It is noted that the radian formed because of the curved cutting portion 334 decides the angle of the arc. If the radian is larger, the arc angle is larger. In contrast, if the radian is smaller, the arc angle is smaller. By comparison with the conventional screw 1, the arc section 332 has a sharp contour because of the radian formed by the curved cutting portion 334.

The shank 32 is non-circular and includes at least three shank sections 321, at least three curved sections 322, and at least three crest portions 323. Each curved section 322 is formed between any two adjacent shank sections 321, and each crest portion 323 is defined at an outermost edge of each curved section 322. The shank sections 321 and the flank section 331 have the same shape, and the curved sections 322 and the arc sections 332 have the same shape. Thus, an outline of the shank 32 corresponds to an outline of the thread convolutions 33 in cross section. When the axis a1 is taken as a center, a distance from the axis a1 to the crest portion 323 is defined as a maximum shank radius r1. A radian formed by the crest portion 323 of each curved section 322 does not exceed a quarter (¼) of the maximum shank radius r1. It is equal to or less than ¼ of the radius r1. Further, the drilling portion 32 can be non-circular and have a sharp point, shown in FIG. 5. In the first preferred embodiment, the thread convolutions 330, the shank 32, and the drilling portion 32 are triangular in shape.

Figure 6:
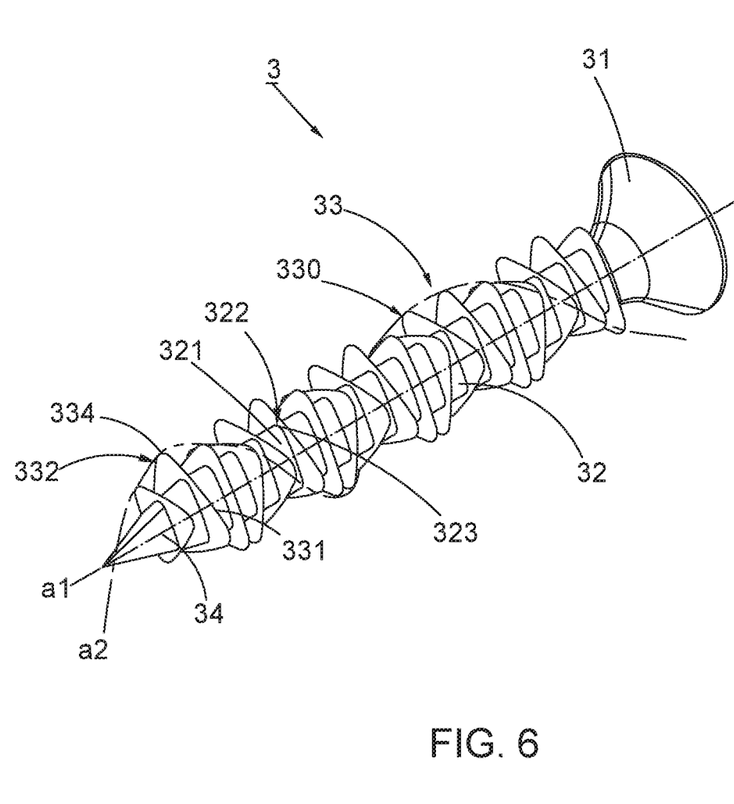
FIG. 6 is a schematic view showing a variation of the first preferred embodiment of this invention.

The operation of the screw 3 is described with the aid of FIGS. 3 to 5. To execute a screwing operation, the drilling portion 34 is put on a surface of a workpiece (not shown) and the head 31 is rotated with a tool (not shown) to drill the drilling portion 34 into the workpiece and allow the threaded portion 33 to cut the workpiece. Because the arc sections 332 with the curved cutting portions 334 have a sharp contour, the curved cutting portions 334 cut the workpiece sharply during the cutting action of the thread convolutions 330. The shape contour also facilitates a firm engagement between the thread convolutions 330 and the workpiece to prevent the loosening of the screw 3 under vibratory conditions. Concurrently, each flank section 331 formed between the arc sections 332 is smaller than an outer diameter of the thread convolution 330, and the radian formed by the curved cutting portion 334 between the joints 333 is equal to or less than a quarter of the maximum thread radius r2, so the friction between the flank sections 331 and the workpiece is reduced during the cutting action of the curved cutting portions 334, and between the thread convolutions 330 is formed a space sufficient to receive more debris caused by the cutting action. Accordingly, the resistance and torque generated during the screwing operation can be decreased, and the cracking of the workpiece caused by undue accumulation of the debris can be prevented. When the first path a2 spirally defined and shown in FIG. 6 is taken into account, the thread convolutions 330 press and cut the workpiece gradually along its spiral arrangement to reduce the resistance and torque and increase the screwing efficiency. Therefore, the cutting ability of the screw 3 is promoted to execute the screwing operation faster, prevent the workpiece from having cracks, and increase the screwing efficiency.

Figures 7, 8:
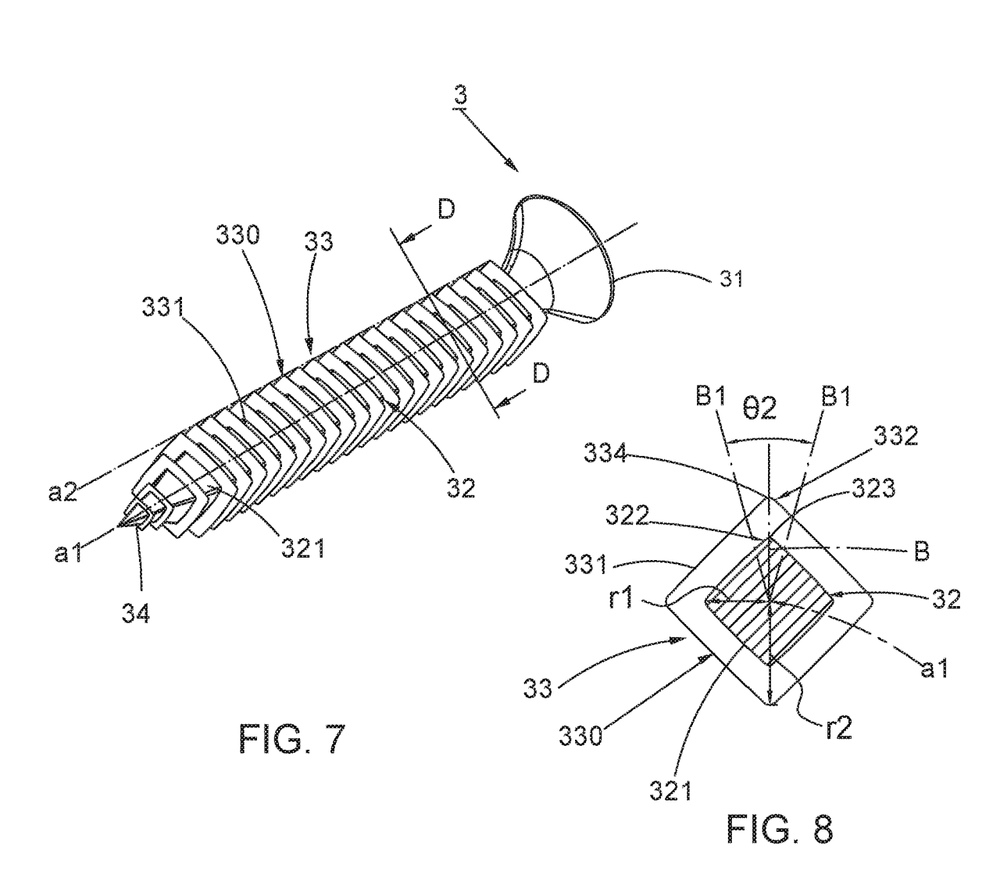
FIG. 7 is a schematic view showing a second preferred embodiment of this invention.
FIG. 8 is a cross-sectional view taken on line D-D in FIG. 7.
Figure 9:
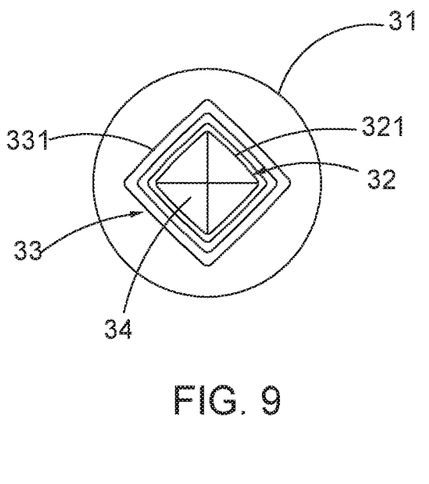
FIG. 9 is a bottom plan view of FIG. 7.

Referring to FIGS. 7 and 8, a second preferred embodiment of the screw 3 still includes a head 31, a shank 32, a threaded portion 33, and a drilling portion 34 and has the same concatenation of correlated elements as that of the first preferred embodiment. This embodiment is characterized in that the shank 32 has four shank sections 321 to have a quadrilateral shape. The radian formed by the crest portion 323 of each curved section 322 does not exceed a quarter (¼) of the maximum shank radius r1. The number of the flank sections 331 the number of the shank sections 321 are the same, so the thread convolution 330 is quadrilateral in shape. The drilling portion 34 is formed into a shape of rhombus and has a sharp point when the quadrilateral shank 32 is formed, as shown in FIG. 9. The drilling portion 34 can be directly formed by rolling with dies (not shown).

When the drilling portion 34 is drilled into the workpiece for starting the cutting action of the thread convolutions 330, the shape of the drilling portion 34 helps an initial positioning effect, and the crest portions 323 and the curved cutting portions 334 which have the same shape cooperate to allow the thread convolutions 330 to be quickly screwed into the workpiece without much effort. Concurrently, because multiple shank sections 321 and flank sections 331 are provided, more space is formed between the screw 3 and the workpiece to help removal of debris and also receive redundant debris to prevent an increase in the resistance and torque and to prevent the cracking of the workpiece caused by too much debris left inside the workpiece.

Figure 10:
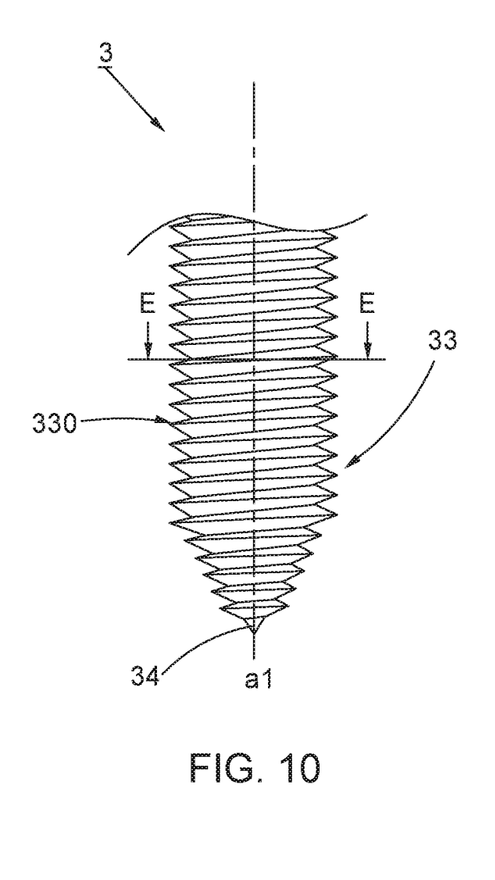
FIG. 10 is a partial schematic view showing a third preferred embodiment of this invention.
Figure 11:
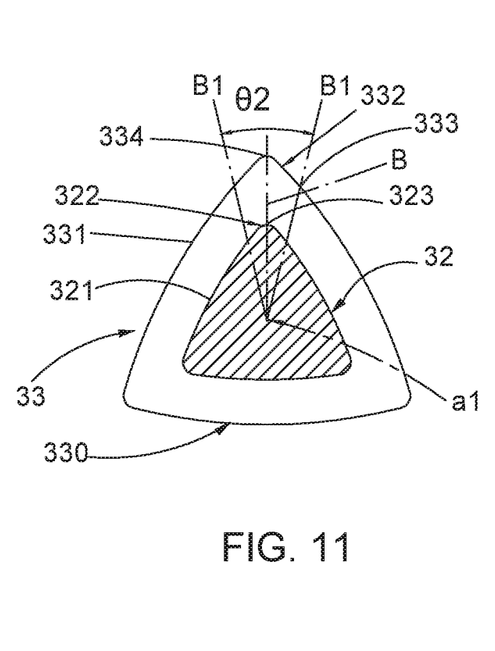
FIG. 11 is a cross-sectional view taken on line E-E in FIG. 10.
Figure 12:
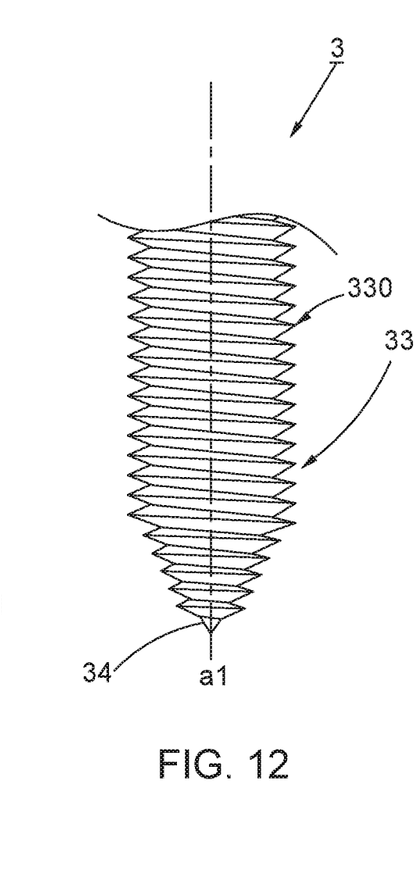
FIG. 12 is a partial schematic view showing a variation of the third preferred embodiment of this invention.

Referring to FIGS. 10 and 11, a third preferred embodiment of the screw 3 has the same concatenation of correlated elements as that of the first preferred embodiment. This embodiment is characterized in that the thread convolutions 330 of the threaded portion 33 spiral densely on the shank 32 and extend to the drilling portion 34. As shown, the shank 32 is not exposed between adjacent thread convolutions 330. The thread convolutions 330 are right-handed convolutions shown in FIG. 10 or left-handed convolutions shown in FIG. 12. Thus, the non-circular thread convolutions 330 and shank 32 assist the curved cutting portions 334 in engaging with the workpiece firmly during the screwing operation of the screw 3. The densely spiraling thread convolutions 330 also accelerate the screwing operation and attain a firm fastening effect.

Figure 13:
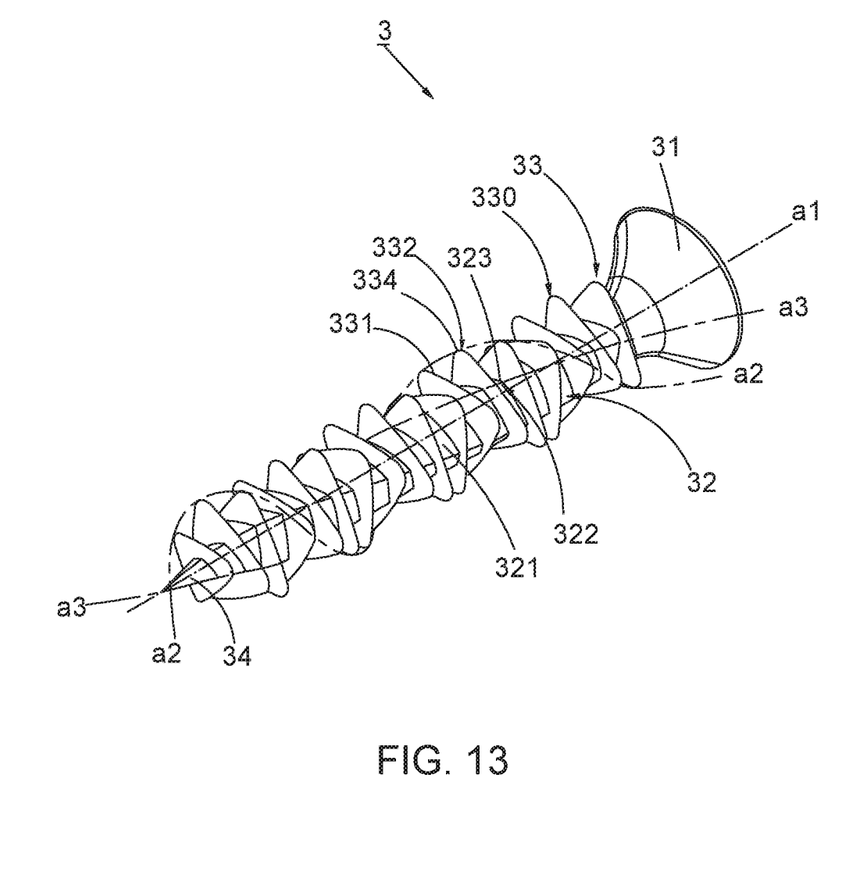
FIG. 13 is a schematic view showing a fourth preferred embodiment of this invention.

Referring to FIG. 13, a fourth preferred embodiment of the screw 3 still includes a head 31, a shank 32, a threaded portion 33, and a drilling portion 34 and has the same concatenation of correlated elements as that of the first preferred embodiment. This embodiment is characterized in that when the thread convolutions 330 are spaced apart to expose portions of the shank 32, the exposed portions define a second path a3 going toward the head 31. Respective ones of the crest portions 323 of the exposed portions at corresponding respective positions are sequentially connected to form the second path a3. For example, each exposed portion of the shank 32 has three crest portions 323 which are situated at different positions, e.g. position A, B, and C, and all crest portions 323 at position A are sequentially connected to assume the second path a2 which represents how the crest portions 323 at the same position are arranged. Further, the second path a3 spirals around the axis a1 to assume a second spiraling mode. The first spiraling mode of the first path a2 of the thread convolutions 330 is different from the second spiraling mode of the second path a3 of the shank 32. Accordingly, the first spiraling mode cuts the workpiece gradually to decrease the resistance and torque at the beginning of the screwing operation, and then the second spiraling mode helps speed up the actions of cutting the workpiece and removing the cut debris. The corresponding crest portions 323 and the corresponding curved cutting portions 334 can have various spiraling arrangements along respective paths a2 and a3. It is noted that the dual spirals along the paths a2 and a3 on the screw 3 move debris out of the workpiece at different speeds and combine with the workpiece by different engaging states, thereby attaining a firm engagement when the screw 3 is fully fastened into the workpiece.

Figure 14:
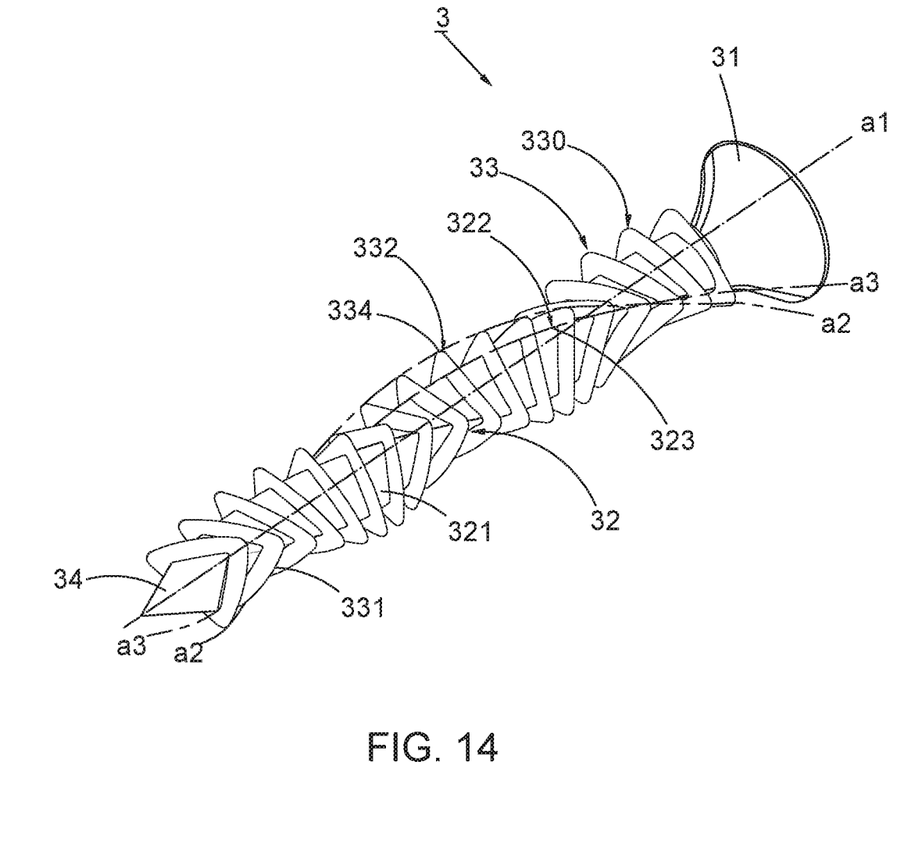
FIG. 14 is a schematic view showing a fifth preferred embodiment of this invention.

Referring to FIG. 14, a fifth preferred embodiment of the screw 3 differs from the fourth preferred embodiment in that the first spiraling mode of the first path a2 is consistent with the second spiraling mode of the second path a3. Accordingly, the shank 32 and the thread convolutions 33 have respective spirals which use the same spiraling mode to decrease the resistance and torque at the beginning of the screwing operation, receive more debris, prevent the cracking of the workpiece, and attain a firm engagement when the screw 3 is fully fastened into the workpiece.

Figure 15:
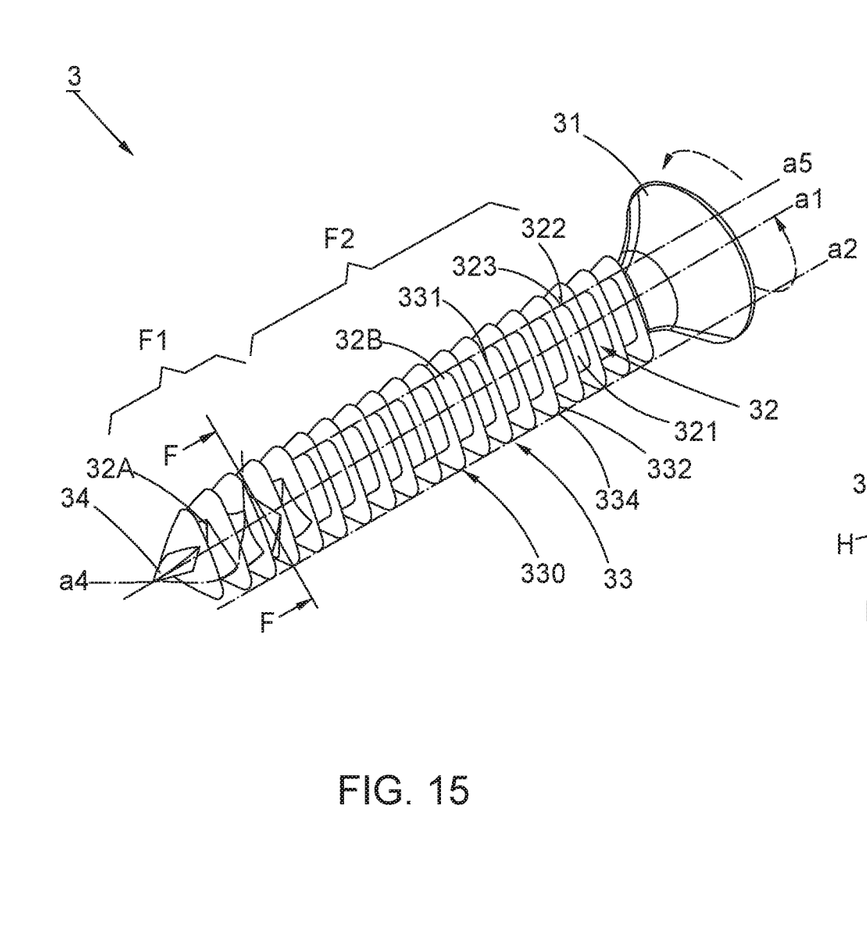
FIG. 15 is a schematic view showing a sixth preferred embodiment of this invention.
Figure 16:
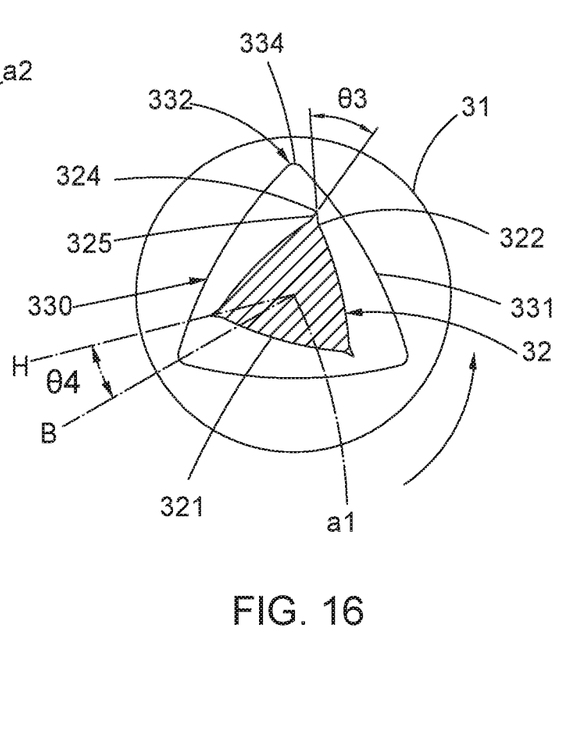
FIG. 16 is a cross-sectional view taken on line F-F in FIG. 15.
Figures 17, 18:
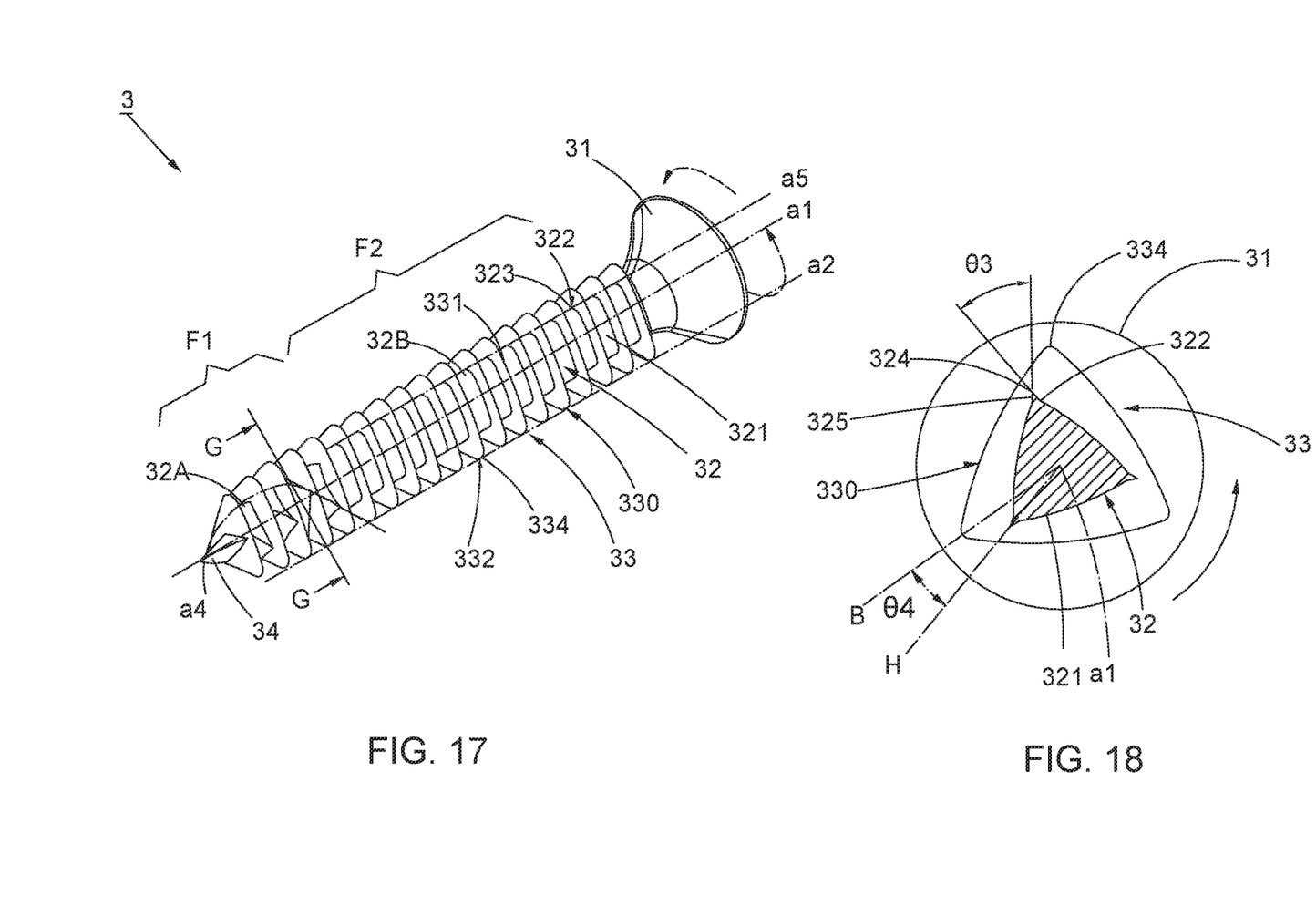
FIG. 17 is a schematic view showing a seventh preferred embodiment of this invention.
FIG. 18 is a cross-sectional view taken on line G-G in FIG. 17.

Referring to FIGS. 15 and 16, a sixth preferred embodiment of the screw 3 still includes a head 31, a shank 32, a threaded portion 33, and a drilling portion 34 and has the same concatenation of correlated elements as that of the first preferred embodiment. This embodiment is characterized in that the screw 3 defines a first region F1 and a second region F2 between the first region F1 and the head 31. The thread convolutions 330 are spaced apart to expose first and second portions 32A, 32B of the shank 32 which are respectively located within the first region F1 and the second region F2 and are different from each other. Each first exposed portion 32A within the first region F1 includes at least three cutting edges 324, each of which is formed at an intersection of two cutting walls 325 protruding from each curved section 322. A third included angle θ3 is an acute angle defined between the cutting walls 325 and ranges from 20 to 60 degrees. The first exposed portions 32A define a third path a4 by connecting respective ones of the cutting edges 324 located at corresponding respective positions sequentially. In short, the cutting edges 324 at the same position are arranged along the third path a4. The third path a4 spirals around the axis a1 and is formed in a right-handed spiral, the same as the screwing direction arrowed in FIGS. 15 and 16. Alternatively, the third path a4 is formed in a left-handed spiral, different from the screwing direction, shown in FIGS. 17 and 18. The shank 32 defines a second reference line H passing from the axis a1 through the cutting edge 324, and the spiral of the third path a4 causes a fourth included angle θ4 which is defined between the two reference lines B and H and is not more than 45 degrees.

The second exposed portions 32B within the second region F2 each have crest portions 323, as previously indicated, but have no cutting edges 324. The second exposed portions 32B define a fourth path a5 parallel to the first path a2 which is preferably parallel to the axis a1. The fourth path a5 is defined by connecting respective ones of the crest portions 323 located at corresponding respective positions sequentially. In short, the crest portions 323 at the same position are arranged along the fourth path a5. Preferably, the thread convolutions 330 extend to the drilling portion 34. Accordingly, the thread convolutions 33 on the drilling portion 34 cut the workpiece gradually at the beginning of the screwing operation to decrease resistance and torque. The first exposed portions 32A within the first region F1 use the cutting edges 324 which construct the spiral arrangement and have an acute angle to help cut and sever undue entangled fibers of the workpiece around the shank 32. Thus, a multiple cutting effect is attained to accelerate the beginning of the screwing operation without using much effort. Then, the thread convolutions 330 and the second exposed portions 32B within the second region F2 whose fourth path a5 is parallel to the axis a1 continue the cutting action quickly. The first and second exposed portions 32A, 32B of the shank 32 having the non-circular shape also remove and receive debris. Therefore, the thread convolutions 330 cooperate with the shank 32 with different exposed portions 32A, 32B to allow the screw 3 to combine with the workpiece firmly by different engaging states and to prevent the screw 3 from loosening, regardless of the material of workpiece.

Figure 19:
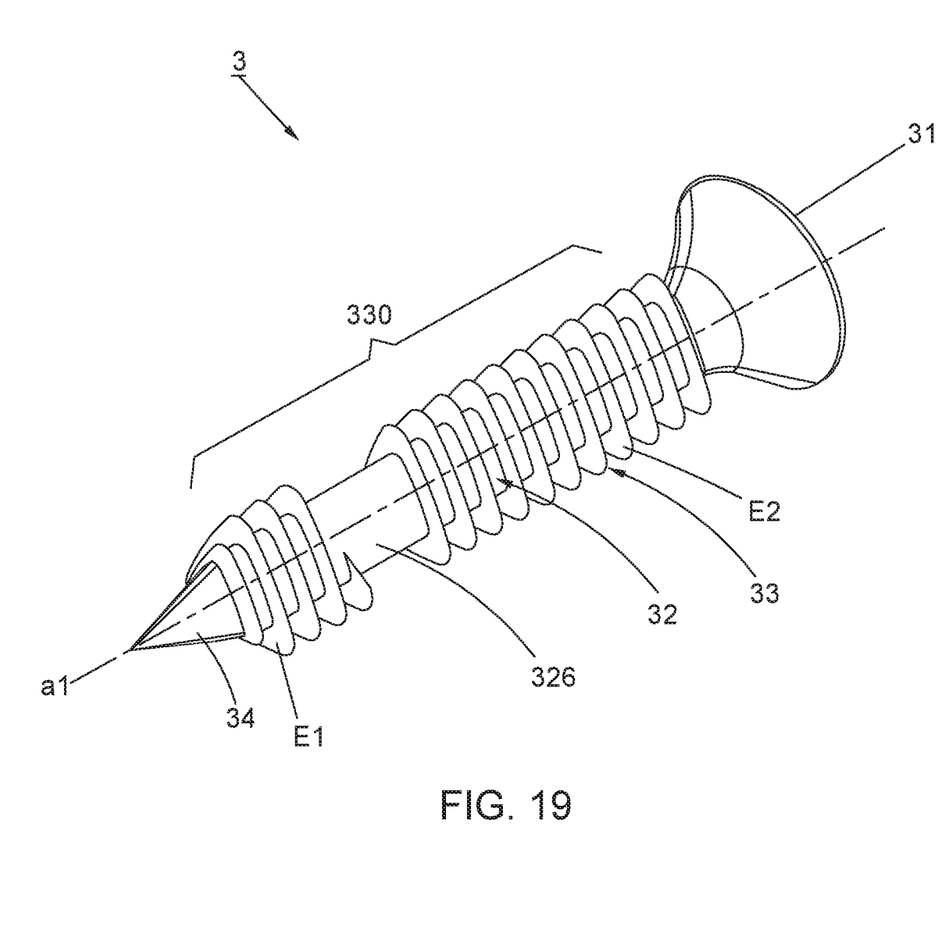
FIG. 19 is a schematic view showing an eighth preferred embodiment of this invention.

Referring to FIG. 19, an eighth preferred embodiment of the screw 3 still includes a head 31, a shank 32, a threaded portion 33, and a drilling portion 34 and has the same concatenation of correlated elements as that of the first preferred embodiment. This embodiment is characterized in that the shank 32 includes a thread-free portion 326 to divide the thread convolutions 330 into first thread convolutions E1 and second thread convolutions E2. During the screwing operation, the first thread convolutions E1 cut the workpiece quickly, and the cut debris travels from the first thread convolutions E1 to the thread-free portion 326. Then, the debris travels from the thread-free portion 326 to the second thread convolutions E2 without obstructions and is thence moved out of the workpiece quickly. Therefore, undue accumulation of the debris is improved to decrease the resistance and torque against the screwing operation and speed up the screwing operation. The second thread convolutions E2 continue the cutting action until the screw 3 is fully screwed into the workpiece and is firmly fastened.

To sum up, each thread convolution of the screw has at least three flank sections, at least three arc sections each formed between any two adjacent flank sections, and at least three curved cutting portions each formed on each arc section. A radian formed by the curved cutting portion does not exceed a quarter of the maximum thread radius, so the curved cutting portion becomes sharp to facilitate a quick cutting action and reduce the friction between the thread convolutions and the workpiece. The non-circular thread convolution increases the space to receive some cut debris and concurrently help smooth removal of debris to reduce the resistance and torque against the screwing operation, increase the screwing efficiency, and prevent the workpiece from cracking.

While the embodiments are shown and described above, it is understood that further variations and modifications may be made without departing from the scope of this invention.

What is claimed is:

1. A quick fastening screw comprising a head, a shank extending longitudinally from said head and defining an axis, a drilling portion connected to said shank and located opposite to said head, and a threaded portion spirally disposed on said shank and defined by a plurality of thread convolutions;
    wherein said shank includes at least three shank sections to become non-circular, each of said plurality of thread convolutions including at least three flank sections and at least three arc sections with at least three curved cutting portions, each of said at least three arc sections being formed between any two adjacent ones of said at least three flank sections, two ends of each of said at least three arc sections and said two adjacent ones of said at least three flank sections meeting at two joints respectively, each of said at least three curved cutting portions being formed between said two joints, each of said plurality of thread convolutions defining a maximum thread radius extending from said axis taken as a center to an outermost edge of each of said at least three curved cutting portions, said threaded portion defining a first path going toward said head, said first path being defined by connecting respective ones of said at least three curved cutting portions of said plurality of thread convolutions located at corresponding respective positions sequentially, each of said plurality of thread convolutions defining a first reference line passing from said axis through each of said at least three curved cutting portions and two boundary lines passing from said axis through said two joints respectively, a first included angle being defined between each of said two boundary lines and said first reference line and ranging from 20 to 25 degrees, a second included angle being defined between said two boundary lines and being not more than 50 degrees.

2. The screw according to claim 1, wherein said shank includes at least three curved sections with at least three crest portions, each of said at least three curved sections being formed between any two adjacent ones of said at least three shank sections, shapes of said at least three shank sections and said at least three curved sections being the same as shapes of said at least three flank sections and said at least three arc sections respectively so that an outline of said shank corresponds to an outline of said plurality of thread convolutions in cross section, said shank defining a maximum shank radius extending from said axis taken as the center to each of said at least three crest portions, a radian formed by each of said at least three crest portions being not more than a quarter of said maximum shank radius.

3. The screw according to claim 1, wherein the number of said shank sections exceeds three.

4. The screw according to claim 1, wherein the number of said flank sections of each of said plurality of thread convolutions exceeds three.

5. The screw according to claim 1, wherein said first path is parallel to said axis.

6. The screw according to claim 1, wherein said first path spirals around said axis to assume a first spiraling mode.

7. The screw according to claim 6, wherein said plurality of thread convolutions are spaced apart to expose portions of said shank, said exposed portions of said shank defining a second path going toward said head, said second path being defined by connecting respective ones of said at least three crest portions of said exposed portions of said shank located at corresponding respective positions sequentially, said second path spirals around said axis to assume a second spiraling mode, said first spiraling mode being different from said second spiraling mode.

8. The screw according to claim 6, wherein said plurality of thread convolutions are spaced apart to expose portions of said shank, said exposed portions of said shank defining a second path going toward said head, said second path being defined by connecting respective ones of said at least three crest portions of said exposed portions of said shank located at corresponding respective positions sequentially, said second path spirals around said axis to assume a second spiraling mode, said first spiraling mode being the same as said second spiraling mode.

9. The screw according to claim 1, wherein said threaded portion spirals densely around said shank and extends to said drilling portion, said plurality of thread convolutions of said threaded portion being either right-handed convolutions or left-handed convolutions.

10. The screw according to claim 1, further defining a first region and a second region between said first region and said head, said plurality of thread convolutions being spaced apart to expose first and second portions of said shank located within said first region and said second region respectively, said first exposed portions of said shank each including at least three cutting edges, each of said at least three cutting edges being formed at an intersection of two cutting walls protruding from each of said at least three curved sections, a third included angle being defined between said two cutting walls and being acute, a third path being defined within said first region by connecting respective ones of said at least three cutting edges of said first exposed portions of said shank located at corresponding respective positions sequentially, said third path spiraling around said axis, a fourth path being defined within said second region by connecting respective ones of said at least three crest portions of said second exposed portions of said shank at corresponding respective positions sequentially, said fourth path being parallel to said first path.

11. The screw according to claim 10, wherein said third path is formed in either a right-handed spiral or a left-handed spiral.

12. The screw according to claim 1, wherein said shank includes a thread-free portion to divide said plurality of thread convolutions into first thread convolutions and second thread convolutions.

13. The screw according to claim 1, wherein a radian formed by each of said at least three curved cutting portions between said two joints is not more than a quarter of said maximum thread radius.

14. The screw according to claim 1, wherein said drilling portion has a non-circular shape and is formed without having said plurality of thread convolutions.

* * * * *